United States Patent

Uyama

[11] Patent Number: 5,121,674
[45] Date of Patent: Jun. 16, 1992

[54] BRAKE BOOSTER
[75] Inventor: Shintaro Uyama, Saitama, Japan
[73] Assignee: Jidosha Kiki Co., Ltd., Tokyo, Japan
[21] Appl. No.: 725,529
[22] Filed: Jul. 3, 1991
[51] Int. Cl.$^5$ ............................................. F15B 9/10
[52] U.S. Cl. ................................. 91/369.3; 91/369.4; 91/376 R
[58] Field of Search .................... 91/376, 369.1, 369.2, 91/369.3, 369.4

[56] References Cited

U.S. PATENT DOCUMENTS

| | | | |
|---|---|---|---|
| 3,143,927 | 8/1964 | French et al. | 91/376 R |
| 4,587,885 | 5/1986 | Boehm et al. | 91/369.3 X |
| 4,643,076 | 2/1987 | Satoh . | |
| 5,031,404 | 7/1991 | Flory et al. | 91/376 R |
| 5,062,348 | 11/1991 | Gotoh et al. | 91/369.2 X |

Primary Examiner—Edward K. Look
Assistant Examiner—Todd Mattingly
Attorney, Agent, or Firm—Flynn, Thiel, Boutell & Tanis

[57] ABSTRACT

An improvement of a variable pressure passage formed in the valve body of a brake booster is disclosed. A variable pressure passage including a first radial passage in which a key member is inserted and a second radial passage continuing from and located rearward of the first radial passage is the basis of the invention. According to the invention, a third radial passage, which also forms the variable pressure passage, is located forwardly of and continues from the first radial passage, and has a circumferential width less than that of the key member. This allows a corresponding increase in the channel area of the variable pressure passage, thereby improving the operational response of the brake booster without the need to increase the axial size of the valve body since the third passage is formed forwardly of the key member.

6 Claims, 2 Drawing Sheets

BRAKE BOOSTER

FIELD OF THE INVENTION

The invention relates to a brake booster, and more particularly, to an improvement of a variable pressure passage formed in a valve body of a brake booster.

DESCRIPTION OF THE PRIOR ART

A brake booster is known in the art comprising a valve body slidably disposed in a shell, a valve plunger slidably disposed within the valve body and mechanically coupled to an input shaft and also forming a part of a valve mechanism, a variable pressure passage formed in the valve body for introducing a pressure fluid into a variable pressure chamber through the valve mechanism, and a key member engaged with the valve plunger. The variable pressure passage includes a first radial passage which is formed to extend radially of the valve body, and a second radial passage having a reduced circumferential width than the first radial passage, as measured in the circumferential direction of the valve body, and extending from the rear side of the first passage. The key member is inserted into the first radial passage and has a width greater than the circumferential width of the second passage, and is reciprocable in the axial direction of the valve body within the first radial passage.

With a conventional brake booster of the kind described, it is desirable to improve the operational response of the brake booster in order to impart a better brake feeling to a driver. With the described brake booster, the second radial passage, which forms the variable pressure passage, may be enlarged axially rearward to increase the rate at which the pressure fluid is introduced into the variable pressure chamber, thereby improving the operational response of the brake booster.

However, this involves the following disadvantages: Specifically, in the conventional brake booster as described above, a bearing mounted on the shell is disposed in sliding contact with the outer periphery of the valve body which is located rearwardly of the second radial passage in order to secure a stroke which is required for the reciprocatory movement of the valve body, with a consequent disadvantage that an enlargement of the second radial passage of the variable pressure passage toward the rear end requires a corresponding increase in the axial size of the valve body.

SUMMARY OF THE INVENTION

In view of the foregoing, the invention provides a brake booster as described above in which the valve body is formed with a third radial passage, as a part of the variable pressure passage, which is disposed forwardly of the first radial passage. The circumferential width of the third passage is chosen to be less than the corresponding width of the key member. With this arrangement, the channel area of the variable pressure passage can be increased by an amount corresponding to the third radial passage, thus allowing an improvement in the operational response of the brake booster as compared with the prior art.

An increase in the channel area of the variable pressure passage does not involve the need to increase the axial size of the valve body as when enlarging the second radial passage which is located rearwardly of the key member, inasmuch as the third radial passage is formed forwardly of the key member. Accordingly, the operational response of the brake booster can be improved without increasing the axial size of the valve body.

Above and other objects, features and advantages of the invention will become apparent from the following description of an embodiment thereof with reference to the attached drawings.

DETAILED DESCRIPTION OF EMBODIMENT

Figure 1:
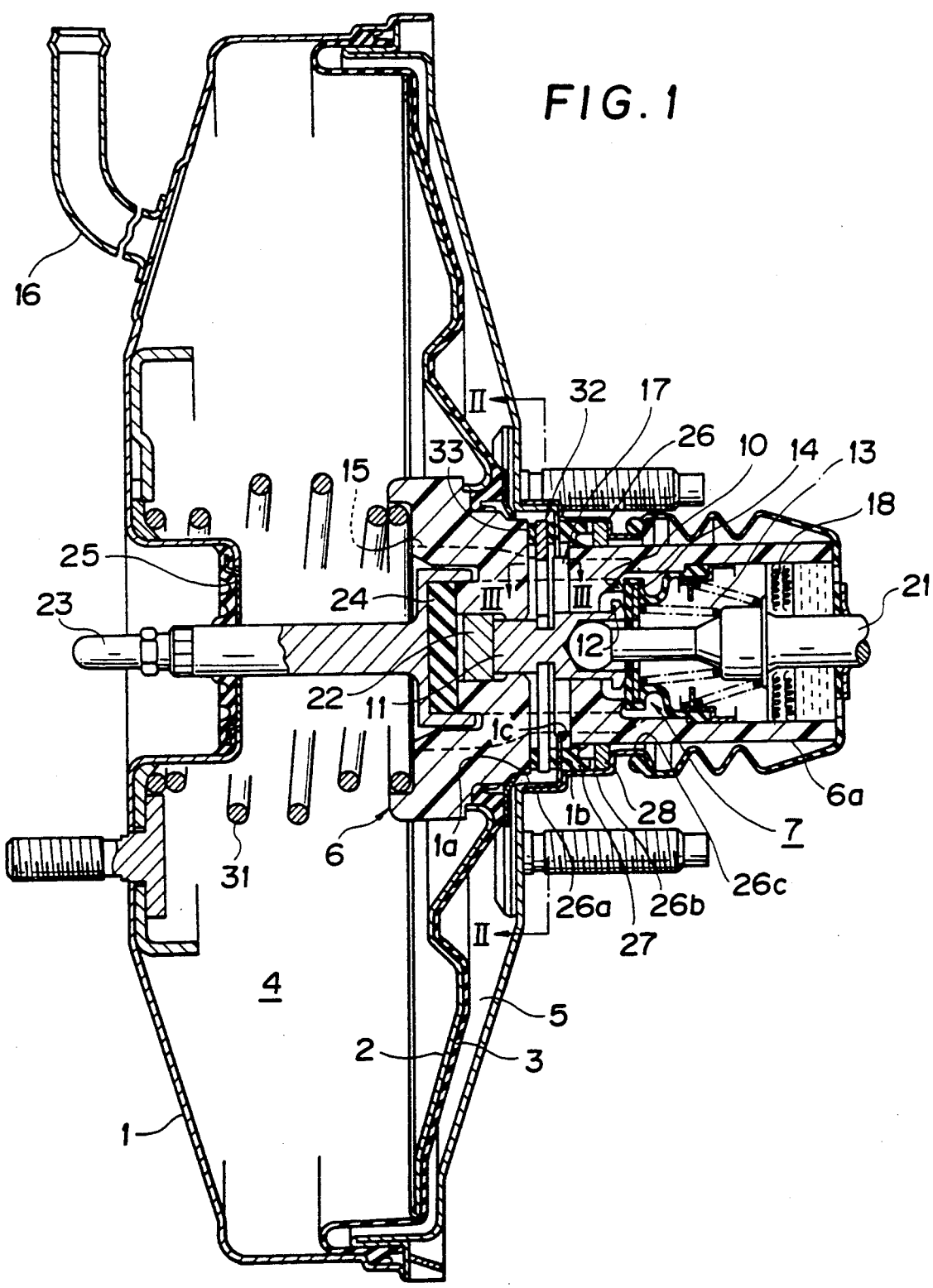
FIG. 1 is a section of one embodiment of the invention.

Referring to FIG. 1, there is shown a brake booster including a shell 1 in which a power piston 2 is slidably disposed. A diaphragm 3 is applied to the back surface of the power piston, and a combination of the power piston 2 and the diaphragm 3 divides the interior of the shell 1 into a forwardly located, constant pressure chamber 4 and a rearwardly located, variable pressure chamber 5. The axial portion of the power piston 2 is integrally formed with a valve body 6, which receives a valve mechanism 7 used to switch a fluid path.

The valve mechanism 7 comprises a first valve seat 10 formed on the valve body 6, a second valve seat 12 formed on a valve plunger 11, and a valve element 14 which is adapted to be seated upon either valve seat 10 or 12 under the resilience of a spring 13 from the rear side of the power piston 2, or from the right, as viewed in FIG. 1. A space located radially outside of a seat region defined by the first valve seat 10 and the valve element 14 communicates with the constant pressure chamber 4 through a constant pressure passage 15 formed in the valve body 6, and the chamber 4 in turn communicates with a source of negative pressure, such as an intake manifold of an engine, through a tubing 16 mounted on the shell 1 for introducing a negative pressure.

On the other hand, a space located between seal regions defined between the first valve seat 10 and the valve element 14, and between the second valve seat 12 and the valve element 14 communicates with the variable pressure chamber through a variable pressure passage 17 formed in the valve body 6. Finally, a space located radially inward of a seat region between the second valve seat 12 and the valve element 14 communicates with the atmosphere through a filter 18.

The valve plunger 11, which forms the valve mechanism 7, is connected to an input shaft 21 which is mechanically coupled to a brake pedal, not shown. A plate 22 disposed on the free end of the valve plunger 11 has its forward end disposed in opposing relationship with a reaction disc 24 which is received in a recess formed in one end of an output shaft 23. The output shaft 23 extends through a seal member 25 to project externally of the shell 1 for connection with the piston of a master cylinder, not shown.

On its rear side, the shell 1 is centrally formed with a cylindrical projection 1a which extends axially rearward, with its free end being followed by a flange 1b which extends radially inward. The inner periphery of the flange 1b is stamped to provide an opening 1c. The valve body 6 has a rearwardly extending cylindrical portion 6a, which extends through the opening 1c and slidably projects to the exterior thereof.

A substantially cylindrical housing 26 is mounted on the cylindrical projection 1a to extend rearwardly therefrom. As viewed from its left end, the housing 26 includes a portion 26a of an increased diameter, another portion 26b of an intermediate diameter and a further portion 26c of a reduced diameter, disposed sequentially in the order they are named. The cylindrical projection 1a is fitted into the portion 26a of an increased diameter into abutment against a step between the portions 26a and 26b. In this manner, the housing 26 is mounted on the cylindrical projection 1a, by utilizing a caulking operation, if required.

The inner wall surface of the step located between the portions 26b and 26c of the housing 26 is disposed in opposing relationship with the outer wall surface of the flange 1b so that a seal member 27 which is disposed in sliding contact with the cylindrical portion 6a of the valve body 6 to maintain a hermetic seal of the opening 1c and a bearing 28 which is in sliding contact with the cylindrical portion 6a to support it may be disposed between the opposing wall surfaces, in a sequential manner as viewed from the front side.

The power piston 2 and the valve body 6 are normally maintained in their inoperative position, shown, by a return spring 31. In this position, the withdrawal of the valve plunger 11 from the valve body 6 is prevented by a key member 32, which is held in abutment against the inner wall surface of the flange 1b, thus limiting a free movement of the valve plunger 11 to the right relative to the valve body 6, so that whenever the input shaft 21 and the valve plunger 11 are operated for the next time, a fluid circuit defined by the valve mechanism 7 may be immediately switched.

It will be noted that elastic members 33 such as may be formed of a rubber are applied to the opposite ends of the key member 32 so that the key member 32 is held in abutment against the inner wall surface of the flange 1b with the elastic members 33 interposed therebetween, thereby preventing sounds of percussion from occurring.

Figure 2:
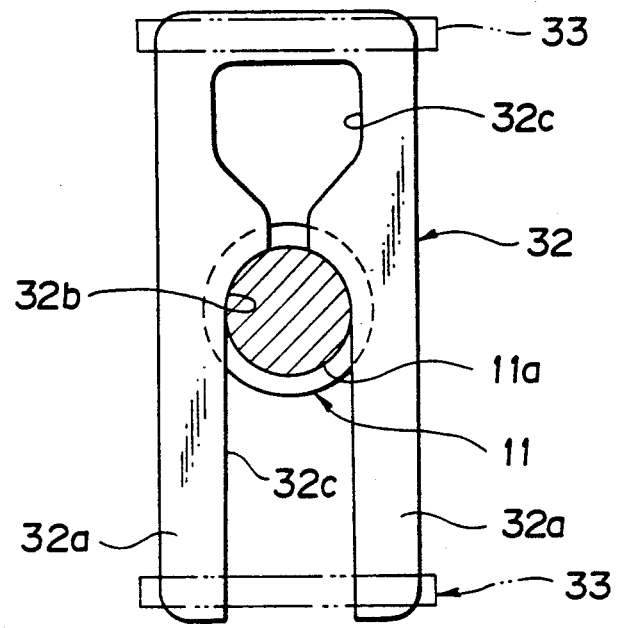
FIG. 2 is a section of part shown in FIG. 1, taken along the line II—II.

As shown in FIG. 2, the key member 32 is generally forked, and is inserted into the variable pressure passage 17 which is formed to extend diametrically through the valve body 6, and has its both limbs 32a fitted in an annular groove 11a formed in the valve plunger 11 so that an engaging portion 32b centrally formed in the fork of the key member is engaged with the groove 11a, thus preventing the withdrawal of the valve plunger 11 from the valve body 6. When inserting the key member 32 into the variable pressure passage 17, the both limbs 32a are engaged with the valve plunger 11, and under this condition, a slit 32c formed in the forked key member 32 allows the spaces located on the opposite sides of the key member 32 to communicate with each other. The elastic members 33 mentioned above are applied to the opposite ends of the key member 32 which project beyond the periphery of the valve body while it is engaged with the valve plunger 11.

Figure 3:
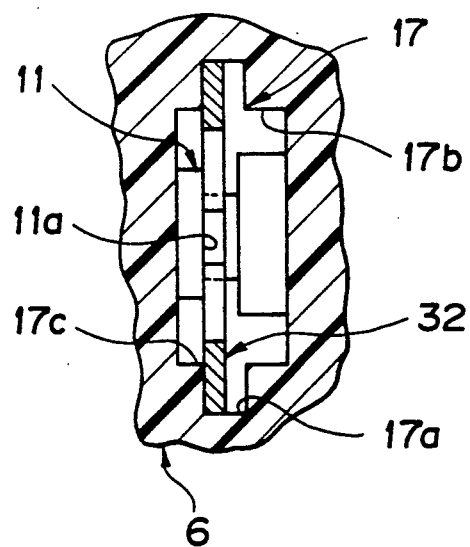
FIG. 3 is a section taken along the line III—III shown in FIG. 1.

As shown in FIG. 3, in the present embodiment, the variable pressure passage 17 in which the key member 32 is inserted is formed by three radial passages; a first radial passage 17a through which the key member 32 is inserted so as to be axially movable, a second radial passage 17b continuing with and located rearwardly of the first passage 17a and having a width less than the width of the first passage 17a as viewed in the circumferential direction of the valve body 6, and a third radial passage 17c disposed forwardly of and continuing from the first radial passage 17a and having a width less than the circumferential width of the first passage 17a (the width of the key member 32).

In the described arrangement, when a brake pedal, not shown, is depressed to drive the input shaft 21 and the valve plunger 11 to the left, the valve element 14 will be seated upon the first valve seat 10 on the valve body 6 to interrupt a communication between the chambers 5 and 4 while moving the second valve seat 12 on the valve plunger 11 away from the valve element 14, whereby the atmosphere will be introduced into the variable pressure chamber 5 through the variable pressure passage 17. Accordingly, a pressure differential across the power piston 2 is effective to drive the power piston 2 forward against the resilience of the return spring 31 to provide a braking action, generally in a similar manner as in the conventional brake booster.

It is to be noted that in the present embodiment, the variable pressure passage 17 comprises three radial passages 17a, 17b and 17c, so that the channel area of the passage 17 can be increased as compared with the prior art, thereby allowing the rate to be increased at which the atmosphere is introduced into the chamber 5. This improves the operational response of the brake booster as compared with the prior art.

In the present embodiment, the channel area of the passage 17 is increased by providing the third radial passage 17c forwardly of the first passage 17a, so that any increase in the channel area cannot cause a reduction in the sliding stroke of the cylindrical portion 6a of the valve body 6 which is in sliding contact with the bearing 28, thus avoiding the need to increase the axial size of the cylindrical portion 6a despite an increased channel area of the passage 17.

In the described embodiment, the variable pressure passage 17 comprises a through-opening which diametrically extends through the valve body 6, but it should be understood that the passage 17 may be formed by utilizing a radial opening formed in the valve body 6 and having a bottom, in which one end of the key member 32 may be received.

While the invention has been described above in connection with an embodiment thereof, it should be understood that a number of changes, modifications and substitutions therein will readily occur to one skilled in the art from the above disclosure without departing from the scope and spirit of the invention defined by the appended claims.

What is claimed is:

1. A brake booster including a valve body slidably disposed in a shell, a valve plunger slidably disposed within the valve body and coupled to an input shaft and also forming part of a valve mechanism, a variable pressure passage formed in the valve body to allow a pressure fluid to be introduced into a variable pressure chamber through the valve mechanism, and a key member engaging with the valve plunger, the variable pressure passage including a first radial passage formed to extend radially of the valve body, and a second radial passage continuing from and located rearwardly of the first radial passage and having a reduced width than the circumferential width of the first passage as referenced to the circumferential direction of the valve body, the key member being inserted into the first radial passage and having a width greater than the circumferential width of the second radial passage and is reciprocable in the axial direction of the valve body within the first radial passage;

characterized in that the valve body is formed with a third radial passage continuing from and located forwardly of the first radial passage to form the variable pressure passage, the circumferential width of the third radial passage being less than the circumferential width of the key member.

2. A brake booster according to claim 1 in which the circumferential width of the third radial passage is substantially equal to the circumferential width of the second radial passage.

3. A brake booster according to claim 1 in which the first, the second and the third radial passage which form the variable pressure passage comprise through-openings formed radially through the valve body.

4. A brake booster according to claim 3 in which the valve plunger is peripherally formed with an annular groove, the key member is forked and includes an engaging portion in its forked area which engages the annular groove in the valve plunger.

5. A brake booster according to claim 4 in which the opposite ends of the key member extend through the variable pressure passage to the outside of the valve body, and abut against the rear wall surface of the shell in the inoperative condition.

6. A brake booster according to claim 5 in which the opposite ends of the key member which abut against the rear wall surface of the shell have elastic members mounted thereon.

* * * * *